United States Patent [19]
Schaenzer et al.

[11] Patent Number: 6,071,007
[45] Date of Patent: *Jun. 6, 2000

[54] THERMAL ASPERITY DETECTION HEAD

[75] Inventors: Mark J. Schaenzer, Eagan; Li Li, Bloomington; Zine-Eddine Boutaghou, Vadnais Heights; Subrahmanyan Nagarajan, Burnsville, all of Minn.

[73] Assignee: Seagate Technology, Inc., Scotts Valley, Calif.

[*] Notice: This patent is subject to a terminal disclaimer.

[21] Appl. No.: 08/978,102

[22] Filed: Nov. 25, 1997

Related U.S. Application Data

[60] Provisional application No. 60/047,323, May 21, 1997.

[51] Int. Cl.⁷ .............................. G01B 5/28; G11B 5/02; G11B 27/36; G01N 25/00

[52] U.S. Cl. .................................. 374/7; 73/105; 360/31

[58] Field of Search ................. 374/4, 6, 7, 124, 374/137, 141, 120, 164, 5; 73/105; 360/31

[56] References Cited

U.S. PATENT DOCUMENTS

| | | | |
|---|---|---|---|
| 4,532,802 | 8/1985 | Yeack-Scranton et al. | 73/866.4 |
| 4,674,875 | 6/1987 | Koizumi | 356/237 |
| 4,757,402 | 7/1988 | Mo | 360/103 |
| 4,802,042 | 1/1989 | Strom | 360/103 |
| 4,811,148 | 3/1989 | Aoki | 360/125 |
| 4,812,927 | 3/1989 | Fechner | 360/75 |
| 4,814,908 | 3/1989 | Schmitz | 360/77.02 |
| 4,816,743 | 3/1989 | Harms et al. | 324/56 |
| 4,870,519 | 9/1989 | White | 360/103 |
| 4,881,136 | 11/1989 | Shiraishi et al. | 360/25 |
| 4,893,205 | 1/1990 | Hoppe et al. | 360/104 |
| 4,928,196 | 5/1990 | Hickok et al. | 360/105 |
| 4,931,338 | 6/1990 | Toffle | 428/65 |
| 4,942,609 | 7/1990 | Meyer | 360/25 |
| 5,012,369 | 4/1991 | Owe et al. | 360/104 |
| 5,063,712 | 11/1991 | Hamilton et al. | 51/67 |
| 5,073,836 | 12/1991 | Gill et al. | 360/113 |
| 5,270,882 | 12/1993 | Jove et al. | 360/67 |
| 5,339,702 | 8/1994 | Viches | 73/865.9 |
| 5,341,256 | 8/1994 | Murata et al. | 360/75 |
| 5,367,409 | 11/1994 | Ottesen et al. | 360/32 |
| 5,374,946 | 12/1994 | Shirakawa | 346/76 |
| 5,410,439 | 4/1995 | Egbert et al. | 360/75 |
| 5,412,519 | 5/1995 | Buettner et al. | 360/73.03 |
| 5,420,736 | 5/1995 | Heim et al. | 360/113 |
| 5,423,111 | 6/1995 | Mori | 29/90.01 |
| 5,424,638 | 6/1995 | Huber | 324/212 |
| 5,450,256 | 9/1995 | Murata et al. | 360/75 |
| 5,450,746 | 9/1995 | Howard | 73/105 |
| 5,450,747 | 9/1995 | Flechsig et al. | 73/105 |
| 5,455,730 | 10/1995 | Dovek et al. | 360/113 |
| 5,527,110 | 6/1996 | Abraham et al. | 374/5 |
| 5,528,922 | 6/1996 | Baumgart et al. | 73/1.79 |
| 5,537,034 | 7/1996 | Lewis | 324/212 |
| 5,543,989 | 8/1996 | Westwood | 360/113 |
| 5,550,692 | 8/1996 | Crane | 360/103 |
| 5,560,097 | 10/1996 | Bajhorek et al. | 29/603.12 |
| 5,581,021 | 12/1996 | Flechsig et al. | 73/105 |
| 5,612,839 | 3/1997 | Jacques | 360/103 |
| 5,625,512 | 4/1997 | Smith | 360/103 |
| 5,644,455 | 7/1997 | Schultz | 360/113 |
| 5,666,237 | 9/1997 | Lewis | 360/75 |

(List continued on next page.)

*Primary Examiner*—Randy W. Gibson
*Attorney, Agent, or Firm*—Westman, Champlin & Kelly, P.A.

[57] ABSTRACT

An apparatus for detecting surface variations on a rotating disc includes a slider, suspension assembly, first surface variation sensor, second surface variation sensor, and a controller. The slider is adapted to fly over the disc. The suspension assembly is coupled to the slider to position the slider over the disc. The first surface variation sensor is disposed on the slider, and provides a first sensor signal based upon slider contact with one of the surface variations. The second surface variation sensor is disposed on the slider and spaced from the first surface variation sensor. The second surface variation sensor provides a second sensor signal based upon slider contact with the surface variation. The controller receives the first and second signals and calculates a position of the surface variation based upon the first and second sensor signals.

17 Claims, 7 Drawing Sheets

U.S. PATENT DOCUMENTS

| | | | |
|---|---|---|---|
| 5,673,156 | 9/1997 | Chen et al. | 360/97.01 |
| 5,680,265 | 10/1997 | Noguchi | 360/46 |
| 5,696,643 | 12/1997 | Tsuwako et al. | 360/73.03 |
| 5,715,110 | 2/1998 | Nishiyama et al. | 360/67 |
| 5,742,518 | 4/1998 | Gui et al. | 364/508 |
| 5,808,184 | 9/1998 | Boutaghou et al. | 73/105 |
| 5,817,931 | 10/1998 | Boutagou | 73/105 |
| 5,825,181 | 10/1998 | Schaenzer et al. | 324/212 |
| 5,864,054 | 1/1999 | Smith, Jr. | 73/105 |
| 5,872,311 | 2/1999 | Schaenzer et al. | 73/105 |
| 5,901,001 | 5/1999 | Meyer et al. | 360/25 |

THERMAL ASPERITY DETECTION HEAD

BACKGROUND OF THE INVENTION

This application claims the benefit of U.S. Provisional Patent Application No. 60/047,323, filed May 21, 1997 and entitled, "Thermal Asperity Detection Head."

The present invention relates to systems for analyzing a surface of a rotating recording disc. More specifically, the present invention relates to a method and apparatus for detecting small defects by detecting the presence and nature of these defects using thermal conduction.

In data processing systems, magnetic disc drives are often used as direct access storage devices. In such devices, read/write heads are used to write data on or read data from an adjacently rotating hard or flexible disk. To prevent damage to either the disc or the read/write head, it has been recognized that the surface of the disc should be very flat and free of any bumps or the like which might be contacted by the read/write head. Also, the read/write heads have been designed so that they will fly over the surface of the rotating disc with a small fly height which is maintained by a film of air. During its flight, the head undergoes continuous vibration, pitch and roll as the topography of the disc changes beneath the head. If the quanity of the disc or the read/write head is poor, occasional rubbing or sharp contact may occur between the disc and the read/write head. Such contact may damage the head or the disc, cause loss of valuable data, or all of these.

Various attempts have been made to provide increased assurance that such undesirable contact between a read/write head and a recording disc does not occur. Rigid manufacturing and quality assurance specifications for both the recording disc and the read/write head have been instituted. Additionally, the art has compensated for the presence of these defects by increasing the fly height of the head, and incorporating correction algorithms into the disc drive circuitry.

Disc inspection for various types of defects, including magnetic, optical and topographic (i.e., delamination, voids inclusions, asperities, etc.) is of critical importance for the increasingly stringent production requirements facing a manufacturer today as smaller drives store more data. Various methods of defect inspection are currently in use. These include optical techniques (fiber interferometry, bulk optic shear interferometry, microISA), magnetic readout (simple screening, HRF, etc.) and mechanical testing. Each of these techniques may play a role in achieving the goal of virtually defect free production of magnetic discs. However, with the market tightening and technical requirements (such as fly height and speed) becoming more exacting and demanding, inspection schemes which are more efficient and accurate are highly advantageous.

For current high performance magnetoresistive (MR) disc drives, there is a need to screen the disc for defects which may impact the MR sensor. The defects of primary interest, are the narrow, tall defects which often escape the detection of the glide head. As the fly height between the MR heads and the disc is reduced, these defects are an increasing problem.

There are essentially two types of heads which are currently being used to screen the discs for surface variations or asperities ("surface variations" and "asperities" are intended to have identical meanings as used herein).

The first type is the certifier head. This is an MR read head which is used to map the disc for flaws in the magnetic layer. When the certifier head encounters a defect, the impact causes the MR element to heat which results in a change in resistance. This causes the MR element output to signal a super pulse followed by a missing pulse. The certifier head is typically used to scan only a portion of the disc (less than 50%) due to its small size, and generally does so at the same height as the product head. Additionally, defects below the normal product head fly height can easily be encountered by the product head in a stressed condition (for example at increased altitude).

The second type of heads which are being developed to screen the discs are wide track heads. These heads have track widths which can reach 60 $\mu$m. Although such heads can easily scan the entire surface of the disc, they are not sensitive enough to detect defects which are less than 2 $\mu$m in diameter. Today, MR track widths are as low as 2 $\mu$m. Thus, the wide track heads are unacceptable to detect a defect in a single track.

SUMMARY OF THE INVENTION

An apparatus for detecting surface variations on a rotating disc includes a slider, suspension assembly, first surface variation sensor, second surface variation sensor, and a controller. The slider is adapted to fly over the disc. The suspension assembly is coupled to the slider to position the slider over the disc. The first surface variation sensor is disposed on the slider, and provides a first sensor signal based upon slider contact with one of the surface variations. The second surface variation sensor is disposed on the slider and spaced from the first surface variation sensor. The second surface variation sensor provides a second sensor signal based upon slider contact with the surface variation. The controller receives the first and second signals and determines a position of the surface variation based upon the first and second sensor signals.

DETAILED DESCRIPTION OF THE PREFERRED EMBODIMENTS

Figure 1:
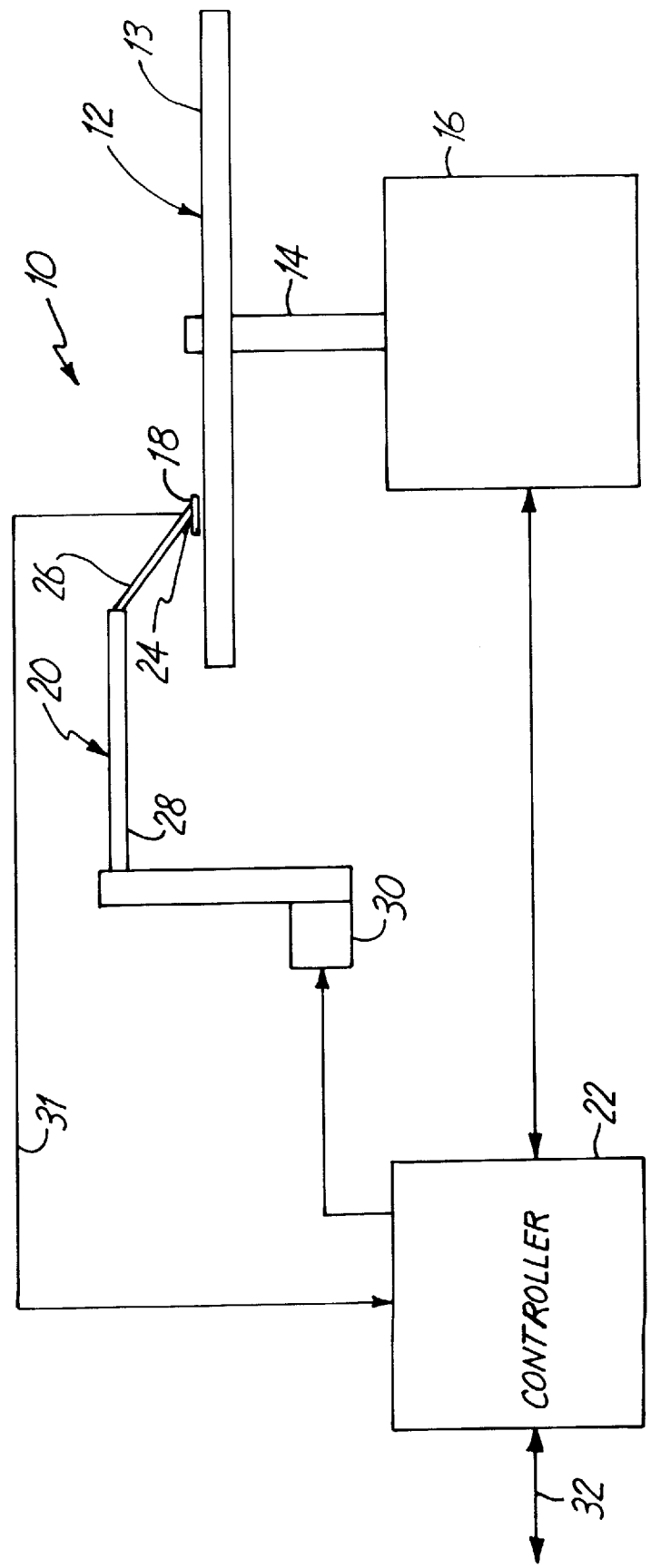
FIG. 1 is a block diagram of an apparatus for detecting asperities in accordance with the present invention.

FIG. 1 is a block diagram of apparatus 10 for detecting asperities on disc 12 in accordance with the present invention. Apparatus 10 includes spindle 14, spindle motor 16, detect head 18, suspension assembly 20, and controller 22. Spindle 14 is adapted to detachably couple disc 12 such that disc 12 rotates with spindle 14. Spindle 14 is coupled to spindle motor 16 such that spindle 14 and disc 12 rotate upon energization of spindle motor 16. Preferably, spindle motor lo also includes a rotary encoder for providing an encoder signal based on a rotary position of spindle 14 and disc 12.

Detect head 18 is adapted to fly over a surface 13 of disc 12 when disc 12 rotates. Additionally, detect head 18 is coupled to suspension assembly 20 such that detect head 18 is positionable with suspension assembly 20 over surface 13.

Suspension assembly 20 includes gimbal 24, flexure arm 26, load beam 28, and actuator 30. Gimbal 24 is coupled to detect head 18 thereby allowing detect head 18 to pitch and roll with the various contours of the surface of disc 12 as detect head 18 flies above disc 12. Gimbal 24 is coupled to flexure arm 26 which is further coupled to load beam 28. Actuator 30, which is preferably a voice coil motor, is coupled to load beam 28 such that energization of actuator 30 causes movement of detect head 18 over surface 13.

Controller 22 is coupled to spindle motor 16, actuator 30, and asperity detection sensors (not shown in FIG. 1) which are disposed on detect head 18. Controller 22 is coupled to spindle motor 16 such that by providing the energization signal, controller 22 controls the extent to which spindle motor 16 rotates spindle 14 and disc 12. Additionally, controller 22 receives the encoder signal from spindle motor 16 such that controller 22 is provided with a signal based upon the rotary position of spindle 14 and disc 12. Controller 22 also provides an actuation signal to actuator 30 which causes actuator 30 to position detect head 18 over surface 13. Thus, controller 22 is able to determine the rotary and radial position of detect head 18 on the surface of disc 12. Additionally, controller 22 receives asperity detection signals 31 from asperity detect sensors (not shown in FIG. 1) on detect head 18, which will be described in greater detail with respect to FIGS. 2 and 4–9. Finally, controller 22 is adapted to determine an asperity location based on asperity detection signals 31, and provide an asperity location output signal to any suitable device through communication link 32.

Figure 2:
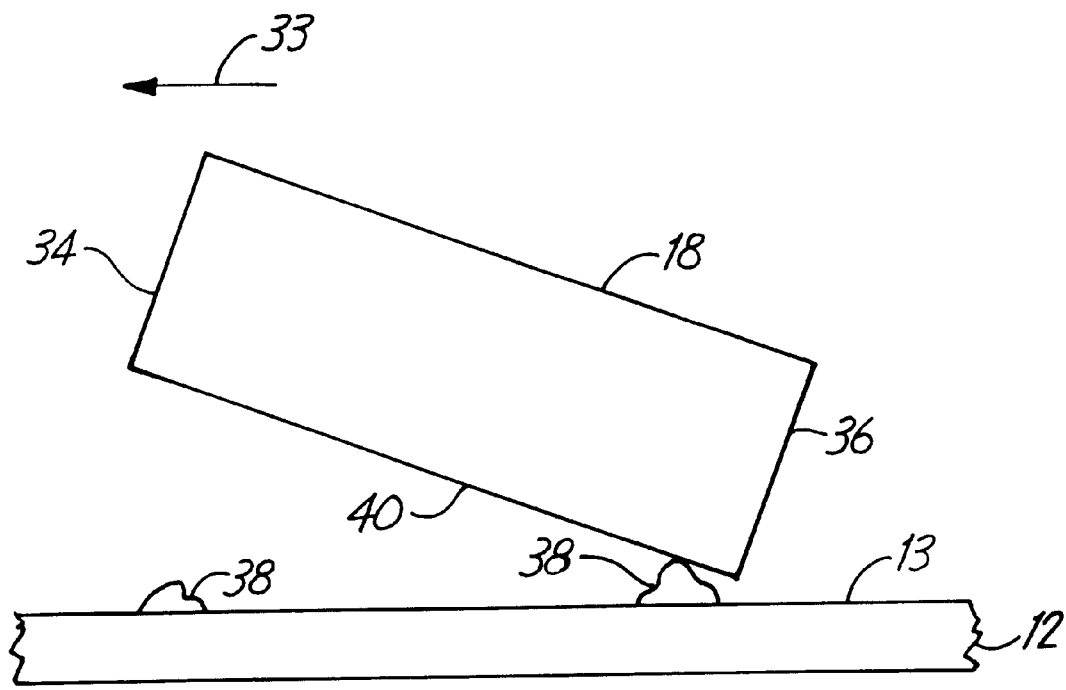
FIG. 2 is a side elevation view of a detect head in accordance with the present invention encountering an asperity on a disc.

FIG. 2 is a side elevation view of detect head 18 in accordance with the present invention encountering an asperity 38 on disc 12. FIG. 2 shows a detect head 18 moving in a direction indicated by arrow 33 with respect to disc 12. As can be seen, detect head 18 flies similarly to heads of the prior art in that a leading edge 34 of detect head 18 flies higher than a trailing edge 36. Asperities 38, which are to be detected, are disposed on surface 13 of disc 12. Thus, as detect head 18 flies over surface 13, asperities 38 collide with bottom surface 40 of detect head 18 proximate trailing edge 36. Such collisions generate heat between asperities 38 and detect head 18, which heat is detectable by detect head 18 such that an asperity detection signal is provided thereby. Detect head 18 may be any detect head of the present invention, as will be described. Further, it is preferred that each asperity detection sensor (which will also be described later) includes a magnetoresistive element which is temperature sensitive.

Figure 3:
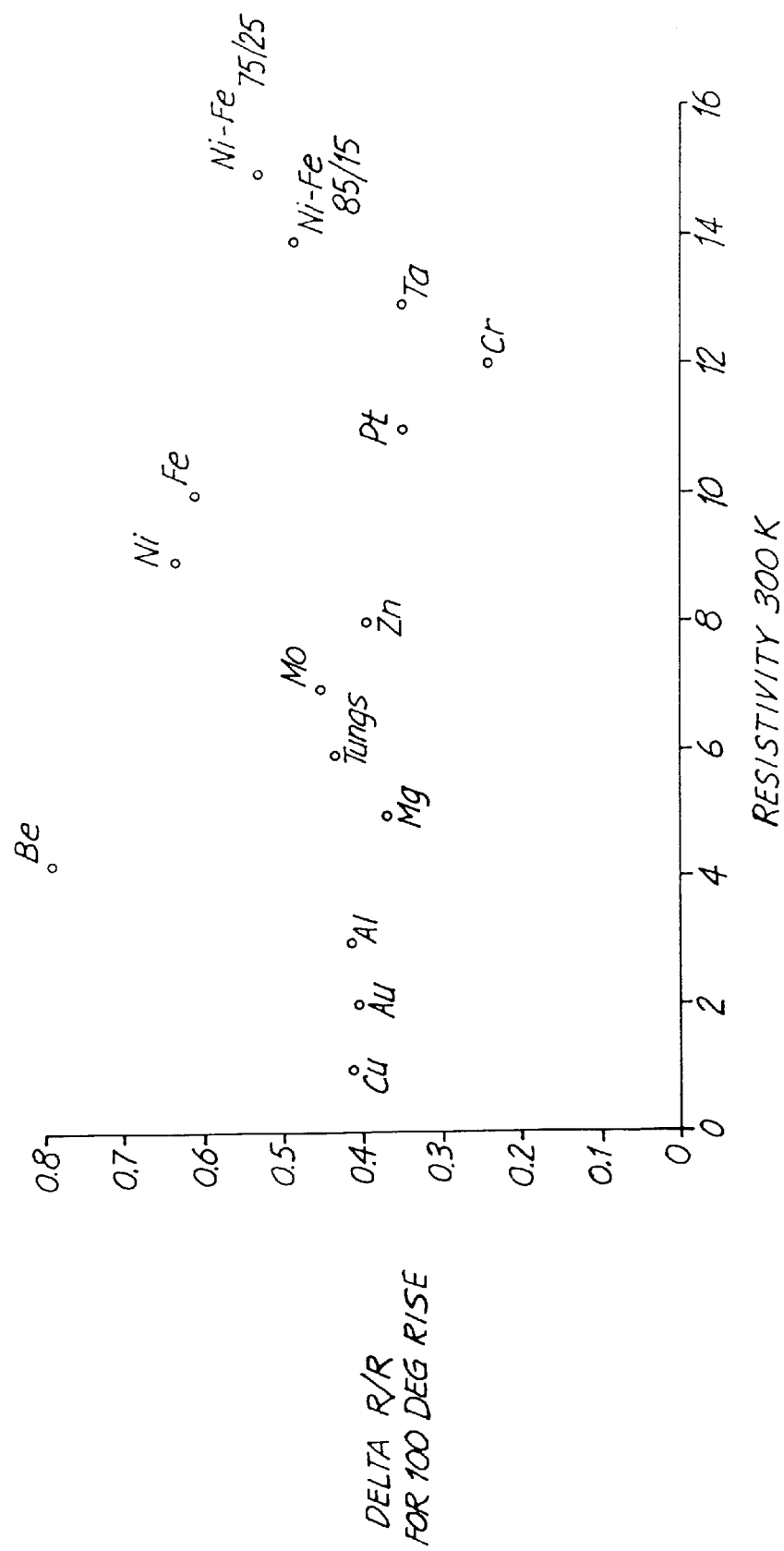
FIG. 3 is a chart of change in resistance for a given temperature change over resistivity for various metals.

Because the magnetoresistive elements are preferably temperature sensitive, proper material selection plays a significant role in achieving an advantageous signal to noise ratio for the detect heads of the present invention. As will be seen, it is desirable to use a material with a low resistivity and a large change in resistance per change in temperature. FIG. 3 is a chart of resistance change for a 100 degree temperature change over resistivity for various metals. Beryllium provides the highest resistance change of all the metals while having a small resistivity. However, potential toxicity problems render beryllium an inappropriate material for the present invention. It is preferable to use nickel for the sensors of the present invention because nickel has a lower resistivity, and an increased ratio of resistance change for a given temperature change, than iron or nickel-iron.

Figure 4:
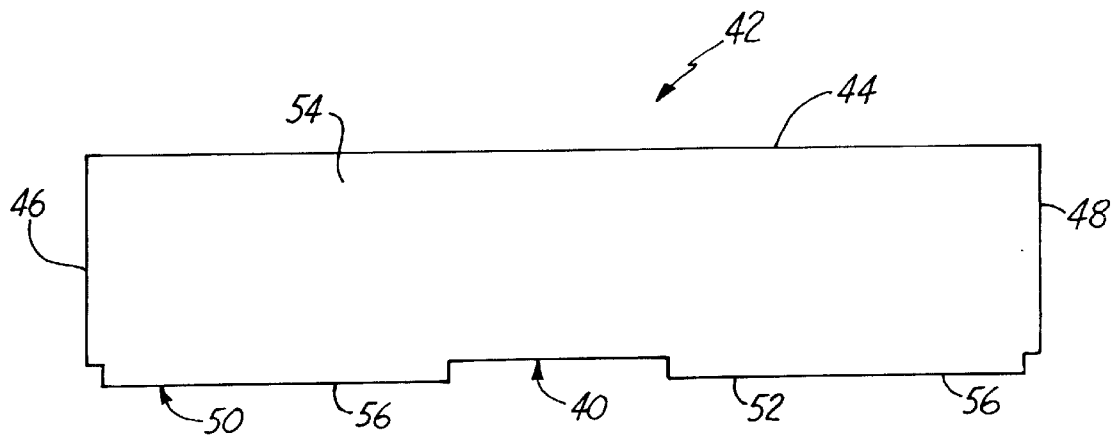
FIG. 4 is a rear elevation view of a slider in accordance with the present invention.

FIG. 4 is a rear elevation view of slider 42 in accordance with the present invention. Slider 42 includes bottom surface 40, top surface 44, first lateral side 46, second lateral side 48, first rail 50, second rail 52 and trailing surface 54. First rail 50 is proximate first lateral side 46 and extends from bottom surface 40. Second rail 52, which is preferably parallel to first rail 50, is disposed proximate second lateral side 48 and extends from bottom surface 40. First rail 50 and second rail 52 include air bearing surfaces 56 which generate lift for slider 42 as slider 42 flies above disc 12. For the purposes of the present invention, any reference to a detect head refers to a combination of slider 42 and asperity detection sensors.

Figure 5:
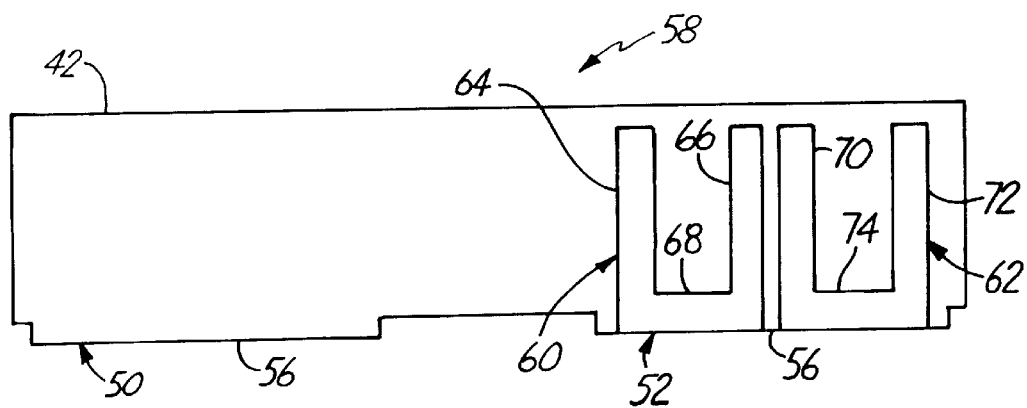
FIG. 5 is a rear elevation view of a detect head in accordance with the present invention.

FIG. 5 is a rear elevation view of detect head 58 in accordance with the present invention. Detect head 58 includes slider 42, and asperity detection sensors 60, 62. Sensor 60 includes first conductor 64, second conductor 66 and active region 68. Likewise, sensor 62 includes third conductor 70, fourth conductor 72 and active region 74. Various layers are deposited upon trailing surface 54 (shown in FIG. 3) of slider 42 in order to form sensors 60, 62, as will be discussed in greater detail with respect to FIGS. 9 and 10. Sensors 60, 62 are spaced apart and disposed proximate trailing surface 54 and second rail 52. Preferably sensors 60, 62 are also disposed transverse to the longitudinal axis of detect head 58, and perpendicular to air bearing surfaces 56. It should also be noted that any appropriate number of sensors could be added to detect head 58 to provide increased resolution and redundancy. For example, additional sensors could be provided proximate first rail 50. By providing multiple asperity detection sensors on a detect head, a larger area can be scanned more accurately and efficiently than prior art detect heads.

Detect head 58 provides an improved signal to noise ratio. This improvement is due in part to the fact that sensors 60, 62 can be easily and repeatedly calibrated. Such calibration merely requires comparing the resistances of active regions 68, 74 of sensors 60, 62, respectively. For example, where active regions 68, 74 are the same size, the ratio of their resistances would theoretically be equal to 1. This ratio would stay the same even as external influences such as ambient heating or the like are introduced to sensors 60, 62. Thus, if during free or unobstructed flight the ratio deviates from the ratio of the as-manufactured detect head, error is indicated and can easily be remedied through compensation. In this manner the ratio is self compensating for changes in resistance which are caused by external influences such as ambient heating, internal self-heating, electronics calibration drift, etc. This form of calibration can be effected with any detect head of the present invention because all that is required is a comparison of the resistance of two sensors.

Figure 6:
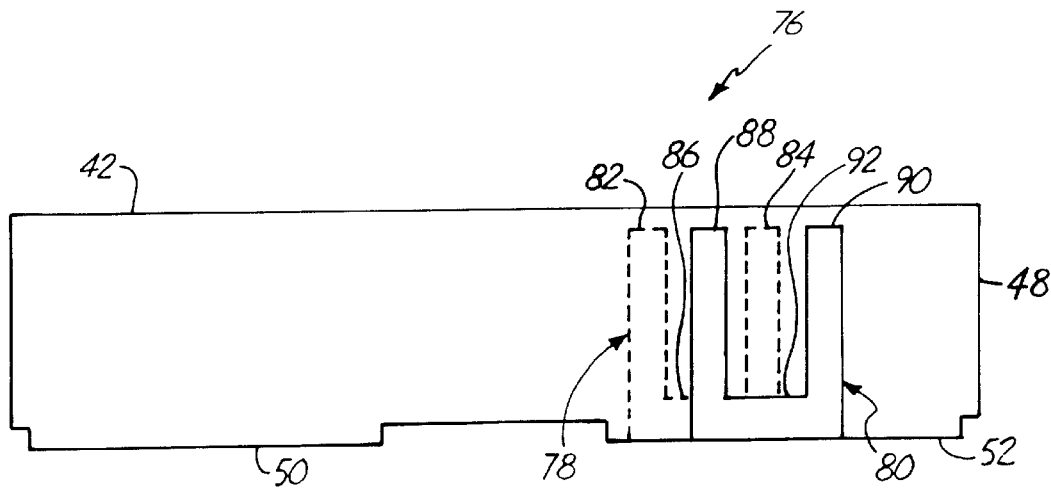
FIG. 6 is a rear elevation view of a detect head in accordance with an alternate embodiment of the present invention.

FIG. 6 is a rear elevation view of detect head 76 in accordance with an alternate embodiment of the present invention. Detect head 76 includes slider 42, and asperity detection sensors 78, 80. Sensor 78 includes first conductor 82, second conductor 84 and active region 86. Likewise, sensor 80 includes third conductor 88, fourth conductor 90 and active region 92. Sensor 78 is shown in phantom to illustrate that it is disposed under sensor 80. As will be described later, sensors 78, 80 are formed from layers. As such, sensor 78 is disposed on a first layer (not shown) which is coupled to trailing surface 54 (shown in FIG. 3). Sensor 80 is disposed on a second layer (not shown) which is on top of the first layer. The spacing between sensors 78 and 80, which is caused by their respective locations on different layers, is referred to as longitudinal spacing.

Sensors 78, 80 are disposed proximate trailing surface 54 and second rail 52. Preferably, sensors 78, 80 are also disposed transverse to the longitudinal axis of detect head 58, and perpendicular to air bearing surfaces 56. Additionally, sensor 78 is nearer trailing surface 54 than sensor 80. As can also be seen, sensor 80 is disposed nearer to second lateral side 48 than sensor 78. The differing proximity of sensors 78 and 80 to second lateral side 48 is referred to as a transverse offset. Sensors 78 and 80 are transversely offset such that active regions 86, 92 overlap. By overlapping active regions 86 and 92, the resolution of detect head 58 is increased. For example, if active region 92 overlaps half of active region 86, then detect head 58 will be able to determine a location of an asperity collision to a precision of one half the width of active region 86 (assuming active regions 86, 92 have the same width). In this manner, detect head 58 can achieve a precision greater than a width of individual active regions. As with the previous embodiment, any appropriate number of sensors may be used to further increase precision, and redundancy. For example, additional sensors could also be provided proximate first rail 50.

Figure 7:
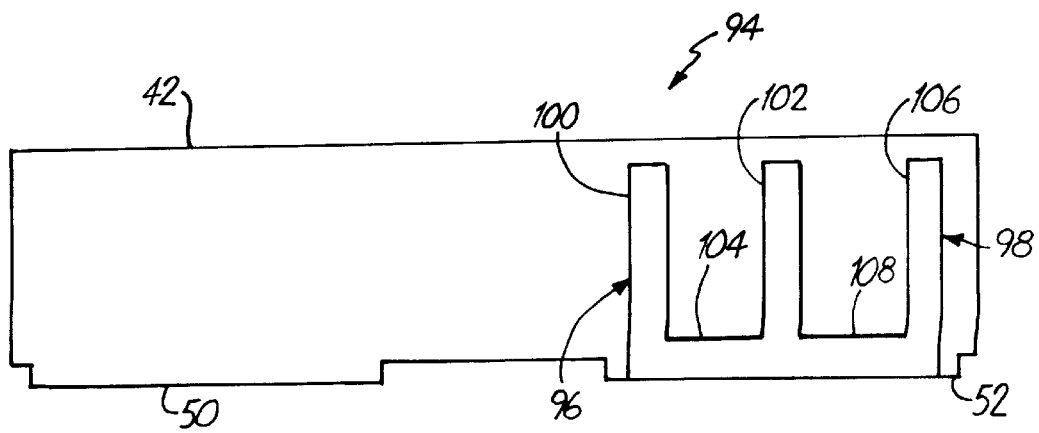
FIG. 7 is a rear elevation view of a detect head in accordance with another alternate embodiment of the present invention.

FIG. 7 is a rear elevation view of detect head 94 in accordance with another embodiment of the present invention. Detect head 94 includes slider 42, and asperity detection sensors 96, 98. Sensor 96 includes first conductor 100, second conductor 102 and active region 104. Sensor 98 includes second conductor 102, third conductor 106 and active region 108. Thus, sensors 96 and 98 share second conductor 102.

Sensors 96, 98 are contiguous (sharing conductor 102) and disposed proximate trailing surface 54 and second rail 52. Preferably, sensors 96, 98 are also disposed transverse to the longitudinal axis of detect head 94, and perpendicular to air bearing surface 56. Active regions 104, 108 are preferably constructed from nickel which has a resistance that varies with temperature. As is known, electricity will follow the path of least resistance. Thus, the temperature of active region 104 is indicated by the resistance between first conductor 100 and second conductor 102. Additionally, the temperature of active region 108 is indicated by the resistance between second conductor 102, and third conductor 106. Although it is possible for current to flow from first conductor 100 to third conductor 106, such current would be forced to travel through active region 104 and active region 108, which preferably sum to a significantly higher resistance than active region 104 or active region 108 alone. Thus, current flow from first conductor 100 to third conductor 106 will be negligible.

The geometry of sensors 96, 98 plays a significant role in increasing the signal to noise ratio of detect head 94. As can be appreciated, the resistance of active regions 104, 108 is proportional to the length of each respective active region. However, a giver asperity collision with detect head 94 will generate a given change in resistance in an active region. Thus, in order to maximize the signal to noise ratio of asperity detect head 94, or any of the detect heads of the present invention, it is advantageous to maintain the resistance across active regions as low as possible. By tapping sensor 94 with second conductor 102 such that current flows from first conductor 100 to second conductor 102 and third conductor 106 to second conductor 102, instead of from first conductor 100 to third conductor 106 the signal to noise ratio of detect head 94 is increased. As with previous embodiments, greater precision and redundancy can be achieved by increasing the number of sensors. By repeatedly tapping active regions 104 and 108 many additional sensors could be advantageously provided.

Figure 8:
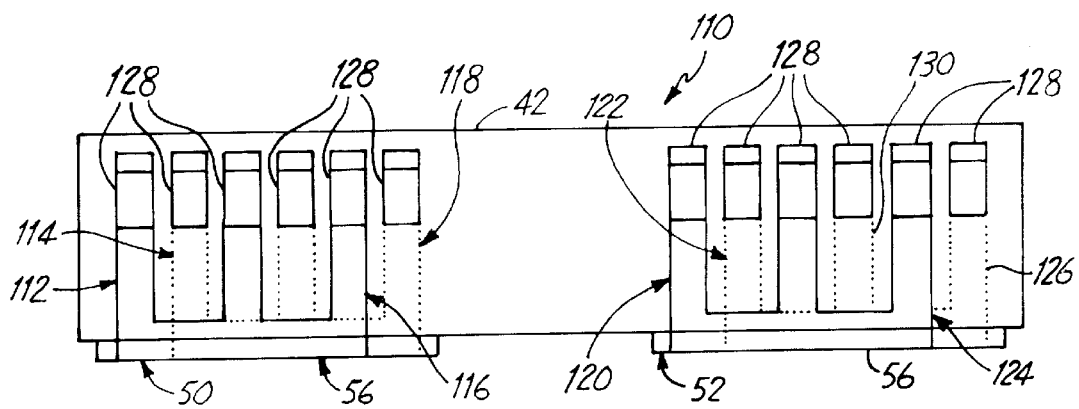
FIG. 8 is a rear elevation view of a detect head in accordance with the present invention.

FIG. 8 is a rear elevation view of detect head 110 in accordance with the present invention. Detect head 110 includes slider 42, and asperity detect sensors 112, 114, 116, 118, 120, 122, 124 and 126. Sensors 120, 122, 124 and 126 are disposed proximate trailing surface 54 and second rail 52. Further, sensors 120, 122, 124 and 126 are disposed transversely from the longitudinal axis of detect head 110, and perpendicular to air bearing surfaces 56. Similarly, sensors 112, 114, 116, and 118 are disposed proximate trailing surface 54 and first rail 50. Further, sensors 112, 114, 116 and 118 are disposed transversely from the longitudinal axis of detect head 110, and perpendicular to air bearing surfaces 56.

Sensors 112, 114, 116, 118, 120, 122, 124, 126 include bond pads 128 to which electrical connections are made to electrically couple sensors 112, 114, 116, 118, 120, 122, 124, 126 to appropriate circuitry such as controller 22. Bond pads 128 are preferably gold and adapted to facilitate wire bonding. However, bond pads 128 may be any other appropriate material.

As can be seen, detect head 110 combines features of the previous embodiments. For example, sensors 122 and 126 share tap 130 which is similar detect head 94 (shown in FIG. 7). Additionally, sensors 122, 126 are transversely offset and spaced longitudinally from sensors 120, 124 which is similar to detect head 76 (shown in FIG. 6). Thus, detect head 110 is the preferred embodiment of the present invention.

Figure 9:
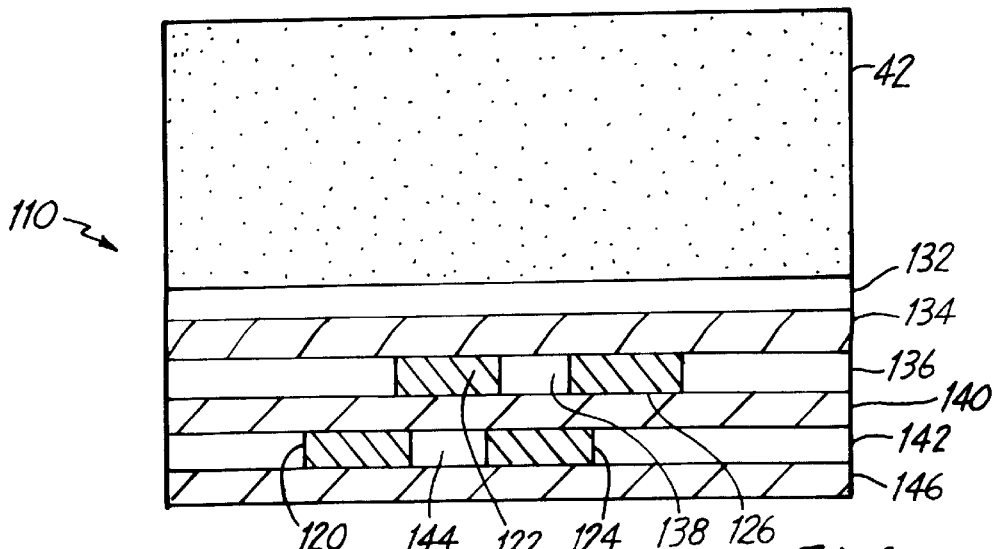
FIG. 9 is a bottom plan view of a portion of a detect head in accordance with the present invention.

FIG. 9 is a bottom plan view of a portion of detect head 110 in accordance with the present invention. Asperity detection sensors 120, 122, 124 and 126 are formed on slider 42 of detect head 110 in various layers. In the preferred embodiment, base layer 132 is contiguous with slider 42. Lower shield layer 134 is contiguous with base layer 132. First sensor layer 136 is contiguous with lower shield layer 134, and provides sensors 122, 126 separated by a first inactive region 138. Although inactive region 138 is depicted differently than sensors 122 and 126, in reality there would be no visible differences between these regions as all regions are formed from the same material, preferably nickel. However, for illustration purposes, such regions are depicted differently.

Mid shield layer 140 is contiguous with first sensor layer 136. Second sensor layer 142 is contiguous with mid shield layer 140, and provides sensors 120 and 124 which are separated by second inactive region 144. Sensors 120 and 124 are transversely offset from sensors 122 and 126 such that they overlap in relation to asperities traveling along the longitudinal axis of slider 42. Finally, top shield layer 146 is contiguous with second sensor layer 142. As will be appreciated by those skilled in the art, insulator layers are generally required between the sensor layers and shield layers. For clarity, such insulator layers have been left out of FIG. 9 and the related description. Additionally, although FIG. 9 depicts sensor layers 136 and 142 as thick, in practice such sensor layers are very thin with thicknesses of preferably about 200 Å to about 1000 Å. Additionally sensor layers 136 and 142 have the same thickness.

Figure 10:
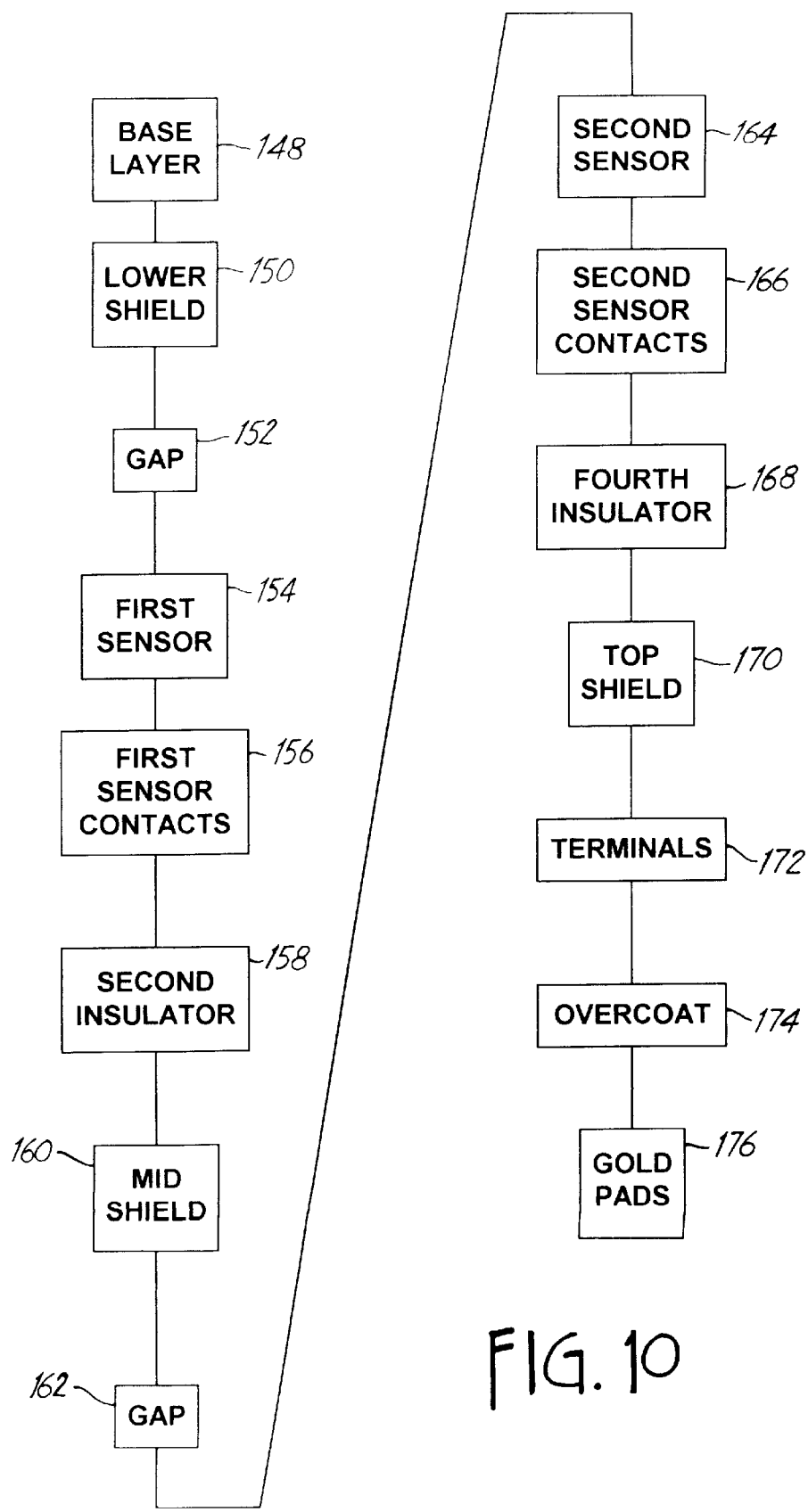
FIG. 10 is a block diagram of a sequence of steps from which to make a detect head in accordance with the present invention.

The preferred embodiment will now be described further with respect to a method of making detect heads of the present invention. FIG. 10 is a block diagram of a sequence of steps through which detect heads of the present invention may be fabricated. Base layer 132 is deposited upon a wafer, which is preferably ceramic, and which will become slider 42. Further, base layer 132 is lap smoothed after deposition, as indicated in block 148. Lower shield layer 134 is deposited upon base layer 132 as indicated by block 150. After the lower shield layer 134 has been deposited, a gap layer is deposited over lower shield layer 134 as indicated by block 152. First sensor layer 136 is deposited thereon, and contacts for sensors residing in layer 136 are patterned as indicated by block 154. Then, the contacts to first sensor layer 136 are deposited, as indicated by block 156. An insulating layer is deposited over the contacts and first sensor layer 136, as indicated by block 158.

The process continues after the insulating layer has been deposited, when mid shield 140 is deposited on top of the insulating layer as indicated in block 160. Another gap layer is deposited on top of mid shield 140, as indicated by block 162. Then, second sensor layer 142 is deposited and patterned on top of the gap layer, as indicated by block 164. After second sensor layer 142 has been deposited, contacts for second sensor layer 142 are deposited and patterned, as indicated by block 166. Another insulating layer is deposited on top of second sensor layer 142, as indicated by block 168. Then, top shield 140 is deposited on top of the insulating layer as indicated by block 170. After top shield 140 has been deposited, terminals for electrical connection to the sensor layers are deposited and patterned, as indicated by block 172. An overcoat layer is deposited over the terminals, and lapped back to the terminals, as indicated by block 174. Finally, gold pads 60 for wire bonding are deposited and patterned as indicated by block 176.

Those skilled in the art will appreciate that fabrication of the detect head of the present invention is very similar to conventional fabrication processes. As such, the detect head of the present invention can be easily fabricated with existing head fabrication techniques and processes. Because such techniques and processes have generally been optimized by the industry, the detect head of the present invention may be fabricated inexpensively.

Although the present invention has been described with reference to preferred embodiments, workers skilled in the art will recognize that changes may be made in form and detail without departing from the spirit and scope of the invention.

What is claimed is:

1. An apparatus for detecting surface variations on a rotating disc, the apparatus comprising:
    a slider having a first rail defining an air bearing surface and having a trailing edge, the slider configured to fly over the rotating disc;
    a suspension assembly coupled to the slider and configured to position the slider over the disc;
    a first surface variation sensor disposed proximate the trailing edge on the first rail, the first surface variation sensor surface variation sensor providing a first sensor signal based on a temperature of the first surface variation sensor related to slider contact with one of the surface variations;
    a second surface variation sensor disposed proximate the trailing edge on the first rail and offset laterally from the first surface variation sensor, the second surface variation sensor providing a second sensor signal based upon a temperature of the second surface variation sensor related to slider contact with the one of the surface variations; and
    a controller coupled to the first surface variation sensor and the second surface variation sensor, and receiving the first and second sensor signals, the controller determining a position of the surface variation based upon the first and second sensor signals.

2. The apparatus of claim 1 wherein the slider has a longitudinal axis, and the air bearing surface is aligned with the longitudinal axis, and the trailing surface is disposed transversely perpendicular to the air bearing surface, and wherein the first surface variation sensor and the second surface variation sensor are longitudinally spaced apart and transversely offset from each other, and wherein the first and second surface variation sensors overlap.

3. The apparatus of claim 2, and further comprising a second rail substantially aligned with the first rail.

4. The apparatus of claim 1 wherein the first surface variation sensor comprises a first plurality of conductors and the second surface variation sensor comprises a second plurality of conductors, and wherein the first and second sensors share exactly one conductor.

5. The apparatus of claim 4 and further comprising a third surface variation sensor longitudinally spaced and transversely offset from the first sensor such that the third sensor partially overlaps the first and second sensors.

6. The apparatus of claim 1 wherein the first sensor is transversely spaced from the second sensor.

7. The apparatus of claim 1 wherein the controller calibrates one of the first surface variation sensor and second surface variation sensor based on a ratio of resistances of the first surface variation sensor and the second surface variation sensor.

8. The apparatus of claim 1 wherein one of the first surface variation sensor and the second surface variation sensor is constructed from nickel.

9. The apparatus of claim 1 wherein the first surfaces variation sensor has a first thickness, and the second surface variation has a second thickness, and wherein the first and second thicknesses are in a range of about 200 Å to about 1000 Å.

10. The apparatus of claim 9 wherein the first and second thicknesses are substantially equal.

11. A method of locating surface variations on a rotating disc comprising the steps of:
    causing a detect head to fly above the disc;
    receiving a first surface variation detection signal from a first temperature sensitive surface variation sensor disposed on a first rail on the head proximate a trailing edge;
    receiving a second surface variation detection signal from a second temperature sensitive surface variation sensor disposed on the first rail, offset laterally from the first surface variation sensor on the head, and proximate the trailing edge;
    determining a position of the surface variation on the disc based on the first and second surface variation signals.

12. The method according to claim 11 wherein the step of receiving the first surface variation signal comprises determining a resistance of the first surface variation sensor.

13. A surface variation detect head for detecting surface variations on a rotating disc, comprising:
    a slider having a first rail defining an air bearing surface and having a trailing edge, the slider configured to fly over the rotating disc;

a first surface variation sensor disposed proximate the trailing edge on the first rail, the first surface variation sensor providing a first sensor signal based on a temperature of the first surface variation sensor related to slider contact with one of the surface variations;

a second surface variation sensor disposed proximate the trailing edge on the first rail and offset laterally from the first surface variation sensor, the second surface variation sensor providing a second sensor signal based upon a temperature of the second surface variation sensor related to slider contact with the one of the surface variations.

14. The apparatus of claim 13 wherein the slider has a longitudinal axis, and the air bearing surface is aligned with the longitudinal axis, and the trailing surface is disposed transversely perpendicular to the air bearing surface, wherein the first variation sensor and the second surface variation sensor are longitudinally spaced apart and transversely offset from each other such that the first surface variation sensor and second surface variation sensor partially overlap.

15. The apparatus of claim 14 wherein the slider further comprises a second rail substantially aligned with the longitudinal axis of the slider.

16. The apparatus of claim 14 wherein the first surface variation sensor comprises a first plurality of conductors and the second surface variation sensor comprises a second plurality of conductors, and wherein the first and second surface variation sensors share exactly one conductor.

17. The apparatus of claim 16 and further comprising a third surface variation sensor longitudinally spaced and transversely offset from the first surface variation sensor such that the third surface variation sensor partially overlaps the first and second surface variation sensors.

* * * * *

UNITED STATES PATENT AND TRADEMARK OFFICE
CERTIFICATE OF CORRECTION

PATENT NO. : 6,071,007
DATED : June 6, 2000
INVENTOR(S) : Schaenzer et al.

Page 1 of 1

It is certified that error appears in the above-identified patent and that said Letters Patent is hereby corrected as shown below:

Column 7,
Line 60, after "sensor" delete "surface variation sensor".

Signed and Sealed this

Thirty-first Day of July, 2001

*Attest:*

*Attesting Officer*

NICHOLAS P. GODICI
*Acting Director of the United States Patent and Trademark Office*